(12) United States Patent
Asrani et al.

(10) Patent No.: US 11,449,981 B2
(45) Date of Patent: Sep. 20, 2022

(54) SYSTEM, METHOD AND APPARATUS FOR MEASURING ENERGY LOSS

(71) Applicant: QEATECH INC., Markham (CA)

(72) Inventors: Mansour Asrani, Toronto (CA);
Peyvand Melati Rad, Markham (CA);
Omid Alaei, Thornhill (CA)

(73) Assignee: QEATECH INC., Markham (CA)

( * ) Notice: Subject to any disclaimer, the term of this patent is extended or adjusted under 35 U.S.C. 154(b) by 373 days.

(21) Appl. No.: 16/369,761

(22) Filed: Mar. 29, 2019

(65) Prior Publication Data
US 2019/0304078 A1 Oct. 3, 2019

(30) Foreign Application Priority Data
Mar. 29, 2018 (CA) .................................. CA 2999665

(51) Int. Cl.
*G06T 7/00* (2017.01)
*G01N 21/95* (2006.01)
(Continued)

(52) U.S. Cl.
CPC .............. *G06T 7/001* (2013.01); *G01J 5/027* (2013.01); *G01J 5/0859* (2013.01);
(Continued)

(58) Field of Classification Search
None
See application file for complete search history.

(56) References Cited

U.S. PATENT DOCUMENTS

| | | | | |
|---|---|---|---|---|
| 4,020,344 A | * | 4/1977 | Kerschbaum | G01J 5/0022 250/330 |
| 4,896,281 A | * | 1/1990 | Mack | G01K 17/00 374/121 |

(Continued)

FOREIGN PATENT DOCUMENTS

| | | | | |
|---|---|---|---|---|
| CA | 3038434 A1 | * | 9/2019 | ............. G06T 7/001 |
| DE | 19929217 A1 | | 2/2000 | |

OTHER PUBLICATIONS

D. González-Aguilera, S. Lagüela, P. Rodríguez-Gonzálvez, D. Hernández-López, Image-based thermographic modeling for assessing energy efficiency of buildings façades,Energy and Buildings, vol. 65, 2013, pp. 29-36 (Year: 2013).*

(Continued)

*Primary Examiner* — Stefan Gadomski
(74) *Attorney, Agent, or Firm* — Own Innovation; James W. Hinton

(57) ABSTRACT

A system for quantifying building envelope energy loss, including a camera assembly for acquiring a building image set of said building envelope reflecting actual energy loss from the building envelope, a comparison image generator for generating a comparison image set using the building image set, data relating to said building, and a predetermined energy loss standard, the comparison image set reflecting a standard energy loss profile of the building envelope that meets the predetermined energy loss standard, an image comparator for comparing the building image set to the comparison image set to determine at least one extent to which the actual energy loss exceeds to the energy loss profile.

22 Claims, 10 Drawing Sheets

(51) Int. Cl.
*G01J 5/02* (2022.01)
*H04N 5/33* (2006.01)
*G01J 5/08* (2022.01)
*G01J 5/00* (2022.01)

(52) U.S. Cl.
CPC .......... *G01N 21/9515* (2013.01); *H04N 5/33* (2013.01); *G01J 2005/0077* (2013.01); *G06T 2207/30184* (2013.01)

(56) References Cited

U.S. PATENT DOCUMENTS

| | | | |
|---|---|---|---|
| 7,208,733 | B2 | 4/2007 | Mian et al. |
| 7,720,635 | B2* | 5/2010 | Donath ................. G01K 17/20 |
| | | | 702/182 |
| 8,086,042 | B2 | 12/2011 | Fellinger |
| 8,442,263 | B2 | 5/2013 | Little et al. |
| 8,452,573 | B2* | 5/2013 | Sarkisian ............ G06F 16/2455 |
| | | | 703/1 |
| 9,152,863 | B1 | 10/2015 | Grant |
| 9,324,138 | B2* | 4/2016 | Olsen ......................... G06T 5/40 |
| 9,805,261 | B1 | 10/2017 | Loveland et al. |
| 9,878,804 | B2* | 1/2018 | Olsen ................... G06K 9/0063 |
| 10,621,744 | B1* | 4/2020 | Spader ....................... G06T 7/60 |
| 2005/0222715 | A1* | 10/2005 | Ruhnke .................... F24F 11/30 |
| | | | 700/276 |
| 2008/0144884 | A1 | 6/2008 | Habibi |
| 2009/0210192 | A1* | 8/2009 | Askar ..................... G01J 5/0003 |
| | | | 702/136 |
| 2010/0296694 | A1* | 11/2010 | Little .................... G01J 5/0003 |
| | | | 382/100 |
| 2010/0324947 | A1* | 12/2010 | Needham ............... G06Q 50/06 |
| | | | 705/7.37 |
| 2012/0078417 | A1* | 3/2012 | Connell, II ........... B25J 13/087 |
| | | | 700/248 |
| 2012/0284124 | A1 | 11/2012 | Harangozo et al. |
| 2013/0060471 | A1* | 3/2013 | Aschheim ............. G01K 17/00 |
| | | | 702/3 |
| 2013/0262029 | A1* | 10/2013 | Pershing ................ G01B 21/28 |
| | | | 702/156 |
| 2015/0025914 | A1* | 1/2015 | Lekas ................ G06K 9/00637 |
| | | | 705/4 |
| 2015/0100267 | A1* | 4/2015 | Mischke ................ G01K 13/02 |
| | | | 702/130 |
| 2015/0302529 | A1* | 10/2015 | Jagannathan .......... G06Q 40/08 |
| | | | 705/4 |
| 2016/0028605 | A1 | 1/2016 | Gil et al. |
| 2016/0086375 | A1* | 3/2016 | Devaki .................... G06F 30/13 |
| | | | 345/419 |
| 2016/0148363 | A1 | 5/2016 | Phan et al. |
| 2016/0246297 | A1 | 8/2016 | Song |
| 2016/0284075 | A1* | 9/2016 | Phan .................. G06K 9/00664 |
| 2017/0103507 | A1 | 4/2017 | Fuchs |
| 2017/0132835 | A1* | 5/2017 | Halliday ................. G06T 19/20 |
| 2017/0180460 | A1 | 6/2017 | High et al. |

OTHER PUBLICATIONS

Ham, Y. and M. Golparvar-Fard. "Automated Cost Analysis of Energy Loss in Existing Buildings through Thermographic Inspections and CFD Analysis." (2013). (Year: 2013).*

Hariharan Naganathan, Wai Oswald Chong, Xuewen Chen, Building energy modeling (BEM) using clustering algorithms and semi supervised machine learning approaches, Automation in Construction, vol. 72, Part 2, 2016, pp. 187-194, (Year: 2016).*

Ham, Y., Golparvar-Fard, M. 3D Visualization of thermal resistance and condensation problems using infrared thermography for building energy diagnostics. Vis. in Eng. 2, 12 (2014). https://doi.org/10.1186/s40327-014-0012-0 (Year: 2014).*

López-Fernández, L., S. Lagüela, D. González-Aguilera, and H. Lorenzo. "Thermographic and Mobile Indoor Mapping for the Computation of Energy Losses in Buildings." Indoor and Built Environment 26, No. 6 (Jul. 2017): 771-84. https://doi.org/10.1177/1420326X16638912. (Year: 2017).*

Fox et al., "Thermography Methodologies for Detecting Energy Related Building Defects", Renewable and Sustainable Energy Reviews, 2014, pp. 296-310, vol. 40.

Mauriello et al., "Understanding the Role of Thermography in Energy Auditing: Current Practices and the Potential for Automated Solutions", CHI Proceedings of the 33rd Annual ACM Conference on Human Factors in Computing Systems, 2015, pp. 1993-2002.

* cited by examiner

| | | | | | | | | | | | | | |
|---|---|---|---|---|---|---|---|---|---|---|---|---|---|
| -0.94 | -0.99 | -1.06 | -1.09 | -1.30 | -2.08 | -2.43 | -3.02 | -3.25 | -3.63 | -4.26 | -4.34 | -4.43 | -4.39 |
| -0.91 | -0.82 | -0.83 | -0.84 | -0.89 | -1.34 | -1.90 | -1.97 | -2.10 | -2.31 | -2.74 | -3.13 | -3.39 | -3.73 |
| -0.99 | -0.84 | -0.89 | -0.92 | -0.88 | -1.05 | -1.75 | -2.05 | -2.08 | -2.18 | -2.00 | -2.03 | -2.13 | -2.32 |
| -1.12 | -1.00 | -1.04 | -1.06 | -1.07 | -1.24 | -1.73 | -2.05 | -2.12 | -2.14 | -2.18 | -2.15 | -2.02 | -1.98 |
| -1.49 | -1.19 | -1.42 | -1.21 | -1.29 | -1.55 | -1.91 | -2.24 | -2.25 | -2.33 | -2.29 | -2.30 | -2.15 | -2.00 |
| -1.65 | -1.64 | -1.64 | -1.59 | -1.56 | -1.76 | -2.10 | -2.39 | -2.45 | -2.44 | -2.44 | -2.39 | -2.22 | -2.02 |
| -1.86 | -1.80 | -1.77 | -1.72 | -1.77 | -2.00 | -2.42 | -2.52 | -2.51 | -2.61 | -2.56 | -2.54 | -2.54 | -2.12 |
| -2.05 | -2.02 | -2.00 | -1.95 | -2.05 | -2.24 | -2.52 | -2.66 | -2.93 | -2.80 | -2.83 | -2.76 | -2.83 | -2.57 |
| -2.29 | -2.25 | -2.25 | -2.29 | -2.36 | -2.52 | -2.74 | -2.92 | -2.92 | -2.99 | -2.98 | -3.09 | -2.92 | -2.67 |
| -2.52 | -2.53 | -2.51 | -2.58 | -2.51 | -2.80 | -2.98 | -3.09 | -3.09 | -3.14 | -3.16 | -3.21 | -3.14 | -2.86 |
| -2.60 | -2.59 | -2.61 | -2.62 | -2.74 | -2.88 | -3.11 | -3.22 | -3.28 | -3.36 | -3.35 | -3.41 | -3.24 | -2.98 |
| -2.70 | -2.75 | -2.68 | -2.66 | -2.75 | -3.14 | -3.28 | -3.52 | -3.47 | -3.62 | -3.58 | -3.57 | -3.62 | -3.24 |
| -3.69 | -3.63 | -3.22 | -3.01 | -2.95 | -3.28 | -3.60 | -3.59 | -3.61 | -3.80 | -3.80 | -3.83 | -3.70 | -3.60 |
| -5.24 | -5.19 | -4.84 | -4.34 | -3.87 | -4.03 | -3.80 | -3.97 | -3.86 | -3.93 | -3.80 | -4.06 | -4.06 | -4.21 |
| -5.55 | -5.31 | -5.34 | -5.25 | -5.42 | -5.36 | -5.02 | -4.90 | -4.42 | -4.27 | -4.14 | -4.11 | -4.18 | -4.17 |
| -5.97 | -5.94 | -5.90 | -5.76 | -5.62 | -5.53 | -5.52 | -5.62 | -5.41 | -5.29 | -4.85 | -4.69 | -4.46 | -4.37 |
| -5.97 | -5.89 | -5.83 | -5.77 | -5.68 | -5.71 | -5.93 | -5.88 | -5.73 | -5.59 | -5.59 | -5.49 | -5.40 | -5.19 |
| -6.21 | -6.03 | -5.90 | -5.78 | -5.73 | -5.76 | -5.82 | -5.98 | -5.96 | -6.16 | -6.05 | -5.96 | -5.75 | -5.59 |
| -4.61 | -5.03 | -5.56 | -6.00 | -6.02 | -5.93 | -5.90 | -5.86 | -6.05 | -6.05 | -6.18 | -6.25 | -6.31 | -6.27 |
| -4.02 | -3.72 | -3.50 | -3.59 | -3.88 | -4.84 | -5.51 | -6.21 | -6.21 | -6.15 | -6.27 | -6.23 | -6.24 | -6.33 |
| -4.36 | -4.16 | -3.80 | -3.64 | -3.45 | -3.19 | -3.24 | -3.24 | -3.86 | -4.78 | -5.77 | -6.24 | -6.42 | -6.43 |
| -4.56 | -4.33 | -3.84 | -3.83 | -3.63 | -3.36 | -3.41 | -3.39 | -3.36 | -3.33 | -3.33 | -3.69 | -4.13 | -4.96 |
| -4.65 | -4.52 | -4.10 | -3.75 | -3.61 | -3.58 | -3.50 | -3.39 | -3.43 | -3.47 | -3.59 | -3.66 | -3.72 | -3.71 |
| -4.54 | -4.52 | -4.11 | -3.92 | -3.67 | -3.50 | -3.47 | -3.39 | -3.38 | -3.45 | -3.71 | -3.81 | -3.83 | -3.81 |
| -4.70 | -4.36 | -4.14 | -3.94 | -3.59 | -3.46 | -3.38 | -3.33 | -3.36 | -3.38 | -3.56 | -3.84 | -3.86 | -3.95 |
| -4.53 | -4.37 | -3.84 | -3.73 | -3.47 | -3.32 | -3.25 | -3.19 | -3.25 | -3.34 | -3.52 | -3.73 | -3.85 | -3.97 |

FIGURE 5

| | | | | | | | | | | | | |
|---|---|---|---|---|---|---|---|---|---|---|---|---|
| -9.93 | -9.93 | -9.93 | -9.94 | -9.94 | -9.96 | -9.96 | -9.98 | -9.98 | -10.02 | -10.02 | -10.02 | -10.03 |
| -9.86 | -9.85 | -9.86 | -9.86 | -9.86 | -9.88 | -9.88 | -9.90 | -9.92 | -9.94 | -9.94 | -9.94 | -9.96 |
| -9.78 | -9.78 | -9.78 | -9.78 | -9.78 | -9.79 | -9.80 | -9.80 | -9.82 | -9.84 | -9.86 | -9.84 | -9.86 |
| -9.71 | -9.70 | -9.70 | -9.71 | -9.70 | -9.71 | -9.72 | -9.73 | -9.73 | -9.73 | -9.74 | -9.74 | -9.75 |
| -9.60 | -9.60 | -9.59 | -9.60 | -9.60 | -9.60 | -9.63 | -9.63 | -9.63 | -9.63 | -9.63 | -9.64 | -9.65 |
| -9.54 | -9.53 | -9.53 | -9.52 | -9.52 | -9.51 | -9.51 | -9.51 | -9.52 | -9.52 | -9.53 | -9.54 | -9.53 |
| -9.44 | -9.44 | -9.44 | -9.44 | -9.43 | -9.44 | -9.43 | -9.42 | -9.42 | -9.40 | -9.40 | -9.40 | -9.40 |
| -9.33 | -9.34 | -9.33 | -9.33 | -9.33 | -9.32 | -9.32 | -9.33 | -9.32 | -9.30 | -9.30 | -9.29 | -9.27 |
| -9.27 | -9.25 | -9.25 | -9.24 | -9.22 | -9.21 | -9.26 | -9.21 | -9.21 | -9.21 | -9.19 | -9.19 | -9.20 |
| -9.20 | -9.19 | -9.17 | -9.16 | -9.16 | -9.14 | -9.13 | -9.13 | -9.13 | -9.13 | -9.12 | -9.10 | -9.11 |
| -9.13 | -9.13 | -9.11 | -9.10 | -9.10 | -9.10 | -9.09 | -9.08 | -9.09 | -9.07 | -9.06 | -9.06 | -9.06 |
| -9.10 | -9.09 | -9.07 | -9.06 | -9.06 | -9.06 | -9.05 | -9.05 | -9.05 | -9.04 | -9.03 | -9.02 | -9.02 |
| -9.07 | -9.06 | -9.06 | -9.05 | -9.04 | -9.03 | -9.03 | -9.04 | -9.03 | -9.03 | -9.02 | -9.02 | -9.01 |
| -9.06 | -9.06 | -9.05 | -9.04 | -9.04 | -9.03 | -9.04 | -9.04 | -9.04 | -9.04 | -9.03 | -9.03 | -9.02 |
| -9.07 | -9.07 | -9.06 | -9.06 | -9.06 | -9.06 | -9.05 | -9.06 | -9.06 | -9.07 | -9.06 | -9.06 | -9.05 |
| -9.10 | -9.10 | -9.10 | -9.10 | -9.10 | -9.09 | -9.10 | -9.10 | -9.10 | -9.12 | -9.11 | -9.11 | -9.10 |
| -9.16 | -9.15 | -9.15 | -9.15 | -9.14 | -9.14 | -9.14 | -9.14 | -9.17 | -9.17 | -9.17 | -9.17 | -9.16 |
| -9.23 | -9.24 | -9.25 | -9.25 | -9.22 | -9.23 | -9.22 | -9.25 | -9.25 | -9.24 | -9.24 | -9.24 | -9.23 |
| -9.29 | -9.31 | -9.31 | -9.30 | -9.32 | -9.31 | -9.32 | -9.33 | -9.35 | -9.34 | -9.34 | -9.32 | -9.32 |
| -9.37 | -9.38 | -9.39 | -9.38 | -9.40 | -9.40 | -9.40 | -9.41 | -9.41 | -9.42 | -9.42 | -9.42 | -9.41 |
| -9.47 | -9.47 | -9.47 | -9.47 | -9.47 | -9.47 | -9.49 | -9.50 | -9.51 | -9.51 | -9.50 | -9.49 | -9.49 |
| -9.53 | -9.54 | -9.56 | -9.55 | -9.57 | -9.56 | -9.58 | -9.59 | -9.59 | -9.60 | -9.60 | -9.60 | -9.61 |
| -9.60 | -9.61 | -9.62 | -9.63 | -9.63 | -9.63 | -9.64 | -9.66 | -9.68 | -9.69 | -9.70 | -9.68 | -9.68 |
| -9.67 | -9.68 | -9.70 | -9.70 | -9.70 | -9.71 | -9.71 | -9.74 | -9.74 | -9.75 | -9.75 | -9.75 | -9.74 |
| -9.71 | -9.73 | -9.74 | -9.75 | -9.77 | -9.77 | -9.78 | -9.78 | -9.81 | -9.82 | -9.82 | -9.81 | -9.81 |
| -9.75 | -9.78 | -9.78 | -9.80 | -9.81 | -9.82 | -9.82 | -9.84 | -9.84 | -9.85 | -9.86 | -9.86 | -9.86 |
| -9.79 | -9.82 | -9.83 | -9.84 | -9.86 | -9.86 | -9.86 | -9.87 | -9.87 | -9.88 | -9.89 | -9.89 | -9.90 |
| -9.81 | -9.84 | -9.86 | -9.87 | -9.89 | -9.89 | -9.90 | -9.90 | -9.90 | -9.90 | -9.92 | -9.91 | -9.92 |
| -9.84 | -9.86 | -9.88 | -9.89 | -9.90 | -9.91 | -9.91 | -9.92 | -9.92 | -9.93 | -9.93 | -9.94 | -9.94 |
| -9.86 | -9.87 | -9.90 | -9.90 | -9.91 | -9.92 | -9.92 | -9.93 | -9.93 | -9.94 | -9.94 | -9.94 | -9.95 |
| -9.86 | -9.88 | -9.89 | -9.90 | -9.91 | -9.93 | -9.92 | -9.93 | -9.94 | -9.94 | -9.94 | -9.94 | -9.94 |

FIGURE 6

SYSTEM, METHOD AND APPARATUS FOR MEASURING ENERGY LOSS

CROSS-REFERENCE TO RELATED APPLICATION

This application claims priority to Canadian Patent Application No. 2,999,665 filed Mar. 29, 2018, the disclosure of which is hereby incorporated by reference in its entirety.

FIELD OF THE INVENTION

This invention is directed to the field of energy efficiency and conservation, and in particular, to that field as it relates to buildings.

BACKGROUND OF THE INVENTION

In recent years, environmental organizations and governments have been assigning progressively greater importance to energy efficiency. One reason for this change has been a concern about climate change, and the undertaking of related obligations, such as in the Paris Agreement. Because energy generation often involves creation and release of greenhouse gases, one of the strategies discussed for reducing greenhouse gas emissions is energy conservation. If less energy is required (due to conservation), less energy will need to be produced, with a consequent reduction in greenhouse gas emissions.

The costs of energy also provide an incentive to energy conservation. Manufacturers of energy-using appliances, for example, seek to improve their energy efficiency, and to advertise these improvements to potential buyers. Such improved energy efficiency not only provides lower operating costs, which lower costs appeal to consumers. Many consumers are also environmentally aware, and will thus prefer energy efficiency out of concern for the environment.

Apart from such incentives, some governments have already begun to promulgate compulsory standards of energy efficiency be met in some contexts. For example, standards have been promulgated in relation to appliances such as furnaces, refrigerators and washing machines.

One type of energy wastage that has received relatively less attention until recently is energy loss in buildings. Often, existing buildings are energy-leaky, and the amount of energy needed to heat or cool these buildings is increased substantially by this leakiness. Better restriction of air passage through the building envelope could typically reduce the amount of heating required by 20%-30%. In cold climates, that can get as high as 50%-60%. In new buildings, better materials and construction methods are often used. However, for both older and newer buildings, it is helpful to determine if the building meets relevant standards, be they compulsory, or private/business-related, or otherwise. In turn, the meeting of standards for maximum energy loss in buildings helps in the achievement of environmental energy conservation goals, and can also reduce costs.

There is some technology in existence used to detect energy loss through building envelopes. For example, there are systems involving blowers used to find pathways of energy loss through doors or windows. Smoker devices have been used to finding leak points in building envelopes.

SUMMARY OF THE INVENTION

Therefore, according to an aspect of the present invention there is provided a system for quantifying building envelope energy loss for a building, the system comprising: a camera assembly, comprising a camera, for acquiring a building image set of said building envelope reflecting actual energy loss from the building envelope; a comparison image generator for generating a comparison image set using the building image set, data relating to said building, and a predetermined energy loss standard, the comparison image set reflecting a standard energy loss profile of the building envelope that meets the predetermined energy loss standard; and an image comparator for comparing the building image set to the image set to the comparison image set to determine at least one extent to which the actual energy loss exceeds to the energy loss profile.

According to another aspect of the invention, there is provided a method of quantifying building envelope energy loss for a building, including using an infrared camera, acquiring a building image set of said building envelope reflecting actual energy loss from the building envelope; using a processor-based comparison image generator, generating a comparison image set using the building image set, data relating to said building, and a predetermined energy loss standard, the comparison image set reflecting a standard energy loss profile of the building envelope that meets the predetermined energy loss standard; and using a processor-based image comparator, comparing the building image set to the comparison image set to determine at least one extent to which the actual energy loss exceeds to the energy loss profile.

Preferably, the system further comprises a report generator for receiving and reporting said at least one extent to which the actual energy loss exceeds to the energy loss profile. Preferably, the comparison image set comprises a comparison numerical map set comprising at least one comparison numerical map. Preferably, the system further comprises an image converter for converting the building image set to a building numerical map set. Preferably, the at least one comparison numerical map is comprised of comparison numerical entries in a comparison table, wherein said numerical entries comprise comparison building envelope temperatures, at building envelope locations, that reflect the standard energy loss profile. Preferably, the building numerical map set comprises at least one building numerical map having building numerical entries in a building table, said building numerical entries comprising actual temperatures at building envelope locations. Preferably, the data includes window measurements and door measurements of said building, and wherein the window measurement and door measurements are calculated using the building image set. Preferably, the data includes roof and wall measurements calculated using the building image set. Preferably, the data includes the size of the building. Preferably, the system further comprises a building envelope crack detector for processing the building image set to detect cracks in the building envelope. Preferably, the report generator further reports at least one report image providing a visual representation of energy loss.

BRIEF DESCRIPTION OF THE DRAWINGS

Reference will now be made, by way of example only, to the figures which illustrate the preferred embodiment of the invention, and in which:

FIG. 5 shows a portion of the map of FIG. 4;

FIG. 6 shows a portion of an example comparison image numerical map;

DETAILED DESCRIPTION OF THE PREFERRED EMBODIMENTS

Figure 1:
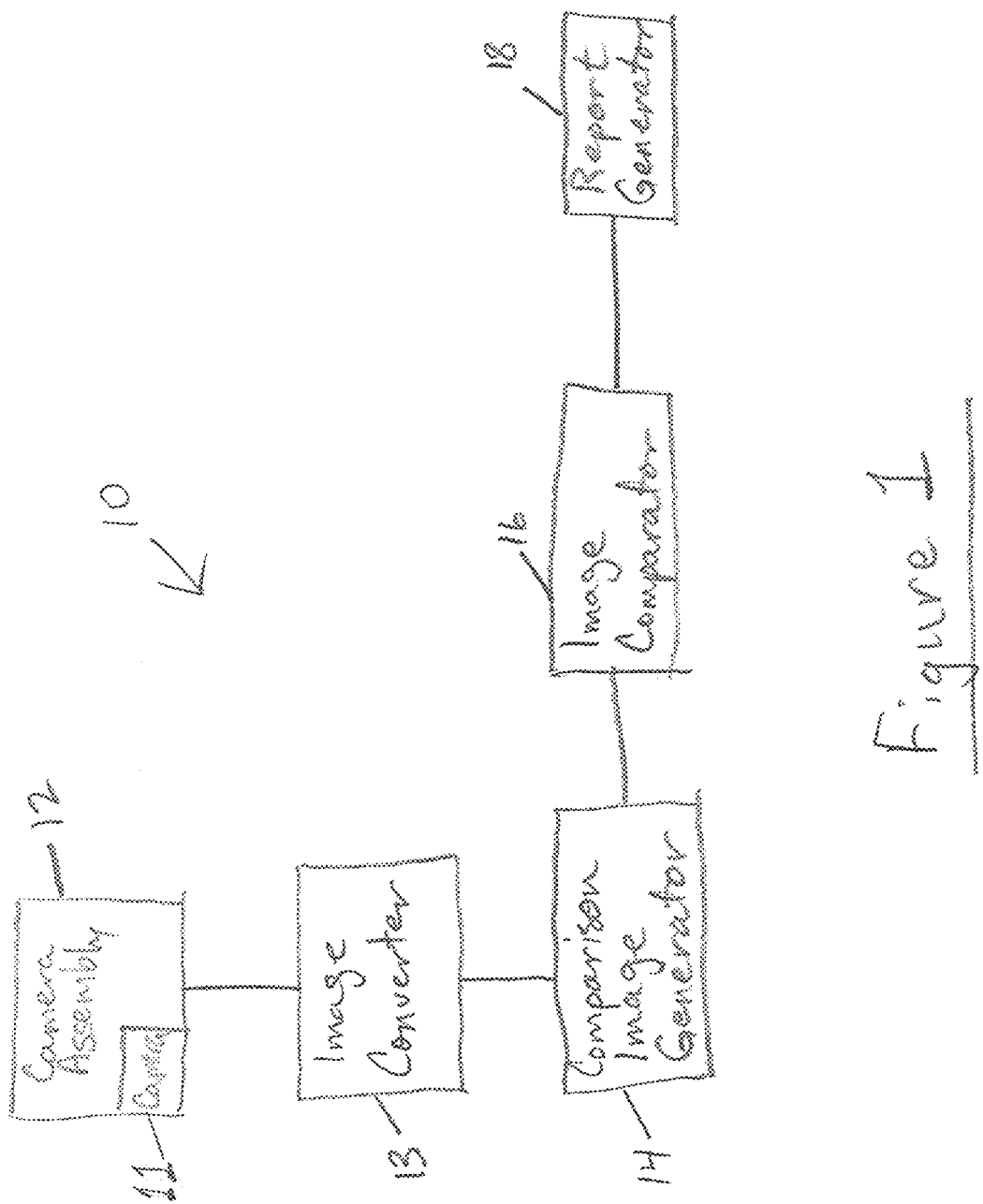
FIG. 1 shows a schematic representation of a preferred system and method of the present invention.

Energy loss from a building is the result of movement of energy from inside the building to the outside of the building through the building envelope. Thus, energy loss is a function of a number of factors, including, importantly, the difference in temperature between the inside and the outside of the building (i.e. the temperature gradient), and how well-insulated the building is to prevent the movement of energy through the envelope. In the present system and method, infrared imaging is used to determine the temperature of the building envelope. When the building envelope is warmer than the outside air, that means that energy is leaking through the building envelope to heat it to a temperature higher than the outside air. In a hypothetical case of perfect insulation, the building envelope would be the same temperature as the outside air, because the energy within the building would be completely prevented from leaking through the walls, roof, doors, and windows to heat the building envelope.

In operation, an embodiment of the invention may be carried out as follows. At least one camera assembly is used to take a set of infrared images of a building (i.e. a building image set containing one or more images), where it is desired to obtain imaging indicating a rate of energy loss from the building envelope. The preferred camera assembly includes a drone mounted infrared camera. It will be appreciated that, in an infrared image of the building envelope, the colour at a particular point corresponds to the temperature of the building envelope at that point. Brighter colours indicate a higher temperature, and therefore higher energy loss from the building envelope, while darker colours indicate a lower temperature, and therefore lower energy loss from the building envelope.

If a portion of an image indicates no energy loss from a particular region of the building envelope, then that region will show up as black in the IR image, meaning that the temperature of that region is the same as the ambient temperature outside the building. Preferably, an ambient temperature measuring apparatus is included in the system, optionally associated with the drone, to measure the ambient temperature outside the building envelope.

The drones will typically have propulsion and control that facilitates movement of the drone between the base and top of a building, as well as over the top of the building to facilitate imaging of the roof. As part of the control, the drone may also include a visible light camera mounted thereto. The visible images may be used for automated control (e.g. sensing the edges of building walls or roof), or to permit a human controller to see these images and direct the drone accordingly to facilitate imaging of the building.

It will be appreciated that the camera assembly need not comprise a drone mounted camera, though the use of an airborne vehicle to obtain comprehensive imaging of a building envelope is strongly preferred for reasons of flexibility and effectiveness. Rather, the camera assembly, including a camera, may take other forms. For example, a standing camera may be used.

In the preferred embodiment, the infrared building image set, which may cover the entire building envelope, or only a portion of it, provides basic data which indicates the rate of energy loss from the building envelope (or a portion of it). As the colours in the IR image correspond to the temperature of the corresponding region of the building envelope, the building image can be converted by an image converter to a building numerical energy loss map, wherein regions of the IR image which have different colours, are converted to regions of the building numerical energy loss map, represented by building envelope temperature numbers. The use of the building numerical map is a preferred step in the process of comparing described further below.

It will be appreciated that the image processing to produce the building numerical energy loss map can produce energy loss maps of varying resolutions. The higher the resolution of the numerical map, the smaller the region of the building image, and of the building envelope, represented by each number. In one embodiment, the resolution of the numerical energy loss map is as high as 2 cm by 2 cm, meaning that each number of the energy loss map represents a 2 cm by 2 cm area of the building envelope. This region may be represented by a single pixel of the building image, so that every pixel of the IR image is converted to a temperature number. However, it will be appreciated that the invention comprehends different resolutions. In some applications, it may be sufficient to have a lower resolution. It will be appreciated that higher resolutions will provide greater precision, but will also require more computing resources. Thus, in particular applications, the computing resources required may be balanced against the amount of precision required to choose the resolution.

Furthermore, the resolution used may depend on how large a building is being imaged, and how much of the building envelope is of concern in the particular application. For example, a large building may require a building image set comprising 1000 or more images to cover the whole building, but if only portions of the building (e.g. only one or more windows, only one or more doors, only the roof, only a portion of the wall) are being analysed, then fewer images actually need to be processed. The resolution of the numerical map can be adjusted accordingly.

In the preferred embodiment, a comparison image set is generated (i.e. one or more comparison images). Preferably, the comparison image set takes the form of a comparison numerical energy loss map set, which reflects the temperature characteristics that the building envelope would have if it met a predetermined standard. Thus, it is generated based on the content of the predetermined standard, and data about the building. For example, for most practical predetermined standards (discussed further below), building data relating to the sizes of each of the windows, walls, doors and roof are relevant, because different levels of energy leakage would be expected from these different parts of a building. Thus, the building image set may be processed to determine these sizes, or this data may be provided separately to the system; either way, these data can be used to generate the comparison image set.

Two example predetermined standards are (1) an applicable building code, and (2) the practical lowest possible energy loss from the building envelope, in light of existing heat insulation technology. It will be appreciated that under example standard (1), more energy loss is permitted, as compared with example standard (2). It will further be appreciated that the use of other predetermined standards is comprehended by the invention.

Building codes vary from one jurisdiction to the next. A building code may specify an upper limit of permissible energy loss for an entire building based on, for example, the size of the building. A building code may also specify upper limits of energy loss from defined portions of a building envelope, such as walls, windows, doors and roof. The comparison image set may provide data on the building envelope as a whole, or on specific features thereof (e.g. windows, walls, doors, roof), or both the whole and the parts.

Regarding example standard (2), it will be appreciated that even a building constructed to the highest practical standards will not have zero energy loss, because that is not practical in the real world. Thus, for example, even such buildings will typically show non-negligible energy loss at doors and windows, because energy loss is generally higher where different parts of a building meet due to air movement. Such a building would have non-negligible energy loss from the roof, both because heat tends to rise (and create a higher temperature gradient at the roof), and because the joint where the roof meets the walls is likely to be more leaky than the walls themselves. Even the walls of this building are likely to have some non-negligible energy loss, both because practically there are no perfect insulators, and because, in some designs, walls can comprise non-integral portions joined together to make the wall, creating a joint that is leakier than an integral wall (e.g. a wall with metal and concrete portions).

In the preferred embodiment, the system further includes an image comparator for comparing the building image set to the comparison image set. In the preferred system in which the comparison image set comprises a one or more numerical maps, the entry in the building image numerical map is compared with the corresponding entry in the comparison image numerical map. Since these entries both represent a portion of the building envelope, the difference between these two entries indicates how much energy is being lost from that corresponding portion of the building envelope as compared with the predetermined standard. When all of the differential energy losses associated with all of the corresponding entries are added together, the energy loss from the portion of the building covered by the particular building image set can be determined.

Preferably, each number on the numerical maps corresponds to a pixel from the building image set, which pixel itself corresponds to a particular region of the building envelope (e.g. a 2 cm by 2 cm region as mentioned above). Thus, each number from the building numerical map set is compared to the corresponding number on the comparison numerical map set. Using appropriate calculation, the difference between the two numbers indicates the net energy loss from the region of the building corresponding to that pixel, relative to the predetermined standard.

It will be appreciated that the generating of the comparison image set, and the comparison of the comparison image(s) to the building numerical map set need not be done one after the other. Rather, the generating of the comparison image, and the comparison with the building numerical map may be done essentially simultaneously. Thus, for each number in the building numerical map, the corresponding number in the comparison numerical map may be generated. Then, the two numbers can be compared and the differential energy loss determined for the corresponding region of the building envelope, as the next numbers for the comparison numerical maps are being generated. In this embodiment, therefore, the generating of the comparison image set, and the comparison with the building image set, are proceeding simultaneously. This simultaneous execution of the two steps is generally preferred, as it permits earlier completion of both steps. The processing of the images is very processor-resource intensive—using a very high-end computer workstation, these tasks take several hours for a typical building. It is less preferred to carry out the comparison image generating step first, and then carry out the comparison step, though in some situations there may be inadequate computing and image processing resources available to use the preferred approach.

The functions of the system beyond the taking of the IR images—including all image processing and calculating functions such as those of the image converter, the comparison image generator, the image comparator and the report generator—are each preferably carried out by processor-based computer(s) having, where required, image processing capability. Each component may have its own dedicated processor-based computing element, or such elements may be combined into one or more elements, co-located or not, some or all of which carry out some or all of the relevant functions. It will be appreciated that the preferred computer(s) generally comprise hardware, and software operating in conjunction with the hardware to carry out image processing, calculation and other computing and electronic communication functions. The computer(s) include processor(s) and one or more memory devices, which memory stores computer readable instructions. The processor(s) are capable of executing the computer readable instructions to cause the computers to execute the functions, actions and methods described herein.

In the preferred embodiment, the system includes a report generator. The report generator receives the data from the comparison of the building image set and generates a report, viewable by the user, stating that the building envelope, or particular portion thereof, is losing energy at an energy loss rate, above and beyond what the energy loss rate would be at the predetermined standard. If there is no loss above and beyond the predetermined standard, or if the loss rate is below that of the predetermined standard, the preferred report generator may so indicate.

Preferably, the report generator includes means for transmitting the report to a user. Thus, for example, the report may be made available online, via the internet, or may be emailed to a user. The report generator may include a cloud based portal for storing the report and facilitating access to it by users and clients. Other means of making the making the report available are comprehended.

Referring now to FIG. 1, a system for quantifying building envelope energy use is shown. System 10 comprises camera assembly 12 including camera 11, image converter 13, comparison image generator 14, image comparator 16 and report generator 18. In the system 10, any component that may be processor-implemented may include one or more processors, one or more physical units or housings, and one or more memory units. Furthermore, any such components may share processor(s) and/or physical unit(s) or housings and/or memory unit(s) with any other such component. Without limiting the generality of the foregoing, a single computer may carry out all of the processor-based functions of the system, in some embodiments.

The camera assembly 12 comprises a camera 11, as described in greater detail below. The camera assembly functions to acquire at least one building image of the building envelope, where the building image reflects actual energy loss from the building envelope.

Figure 2:
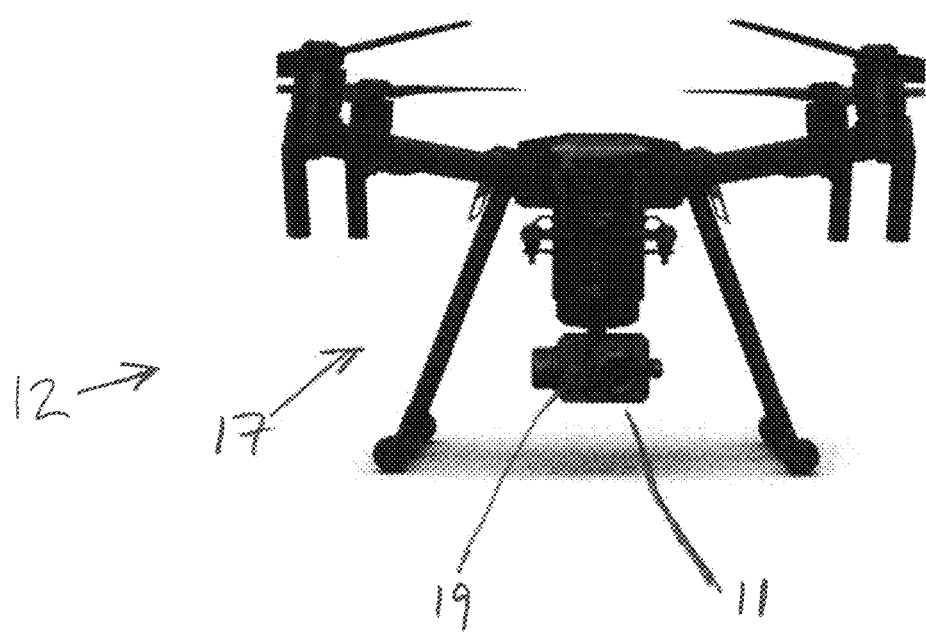
FIG. 2 shows an example camera assembly.

FIG. 2 shows the camera assembly 12 in accordance with a preferred form of the invention. In the preferred embodiment, the camera assembly can acquire one or more building images of a building envelope, where the building may be multiple stories in height. Therefore, preferably, the camera assembly includes at least one unmanned aerial vehicle 17 (UAV, also referred to as a drone herein) for carrying the camera 11. It will be appreciated that other means of control may be used as part of the camera assembly, and still be comprehended by the invention.

Preferably, the camera 11 comprises a modified pan-tilthead infrared camera. The preferred camera assembly 12 further also comprises a laser/visual camera 19, including GPS technology, with which the camera 11 is preferably synchronized. It will be appreciated that the camera, preferably an infrared camera, will be used to obtain a building image set of the building envelope, which image set reflects actual energy loss from the building envelope. The synchronized visual and IR cameras are mounted on the drone to facilitating reading the real temperature signature of the building envelope.

The visual camera is used as part of the guidance apparatus that forms part of the camera assembly 12. Thus, the visual camera can be used by the system to determine when the top or the edge of a building envelope has been reached, to indicate that, for example, the acquisition of a particular infrared image should stop. Alternatively, as another example, if the drone is moving from building to building, and taking images of various building envelopes, the visual camera may be used to guide the drone between buildings, and to determine when the taking of infrared images can start and end.

The UAVs may include propulsion means that allow them to travel vertically and horizontally to obtain building images. One common UAV propulsion system which may be appropriate involves appropriately-positioned propellers, with the propellers being powered electrically from batteries, whether secondary cell (rechargeable), or primary cell (non-rechargeable). Other propulsion systems are also comprehended by the invention as part of the camera assembly.

The preferred camera assembly 12 is processor-controlled, with associated memory. Preferably, the processor-controlled drone is actuated with pre-planned, robotic flight taking into account, inter alia, angle relative to the building envelope, speed, and distance from the building. This provides the preferred means of controlling the UAV, controlling the camera 11 to acquire the building image set, and transmitting it to the image converter 13. The image converter 13 converts the building image set to a building numerical energy loss map, as described above.

Figure 3:
FIG. 3 shows an example infrared building image.

Referring now to FIG. 3, an example building image is shown, which building image could comprise a building image set, or one image therefrom. The building shown in FIG. 3 is a single family dwelling in the form of a detached house. The image shows a front door, windows, portions of the roof, and walls.

FIG. 3 is an infrared image, and the brighter portions indicate higher temperature on the building envelope relative to the outside air and therefore more energy loss, and darker colours indicate lower such temperatures, and thus less energy loss. It will be appreciated that this imaging is used when the interior temperature of buildings is higher than the outdoor temperature. In most cases, the present system is for use when the outdoor air temperature is at least ten degrees Celsius below the interior building temperature. If a point on the building envelope is black, it means that that point is the same temperature as the outdoor air, which means that no heat is leaking from inside the building through that part of the building envelope to cause that point to be warmer. In FIG. 3, the roof portions above the garage and the front door are quite well insulated, as the image shows them as dark blue in colour. By contrast, the right and left sides of the front door are allowing substantial energy loss, as is indicated by the bright yellow colour in the image. (If these IR images are copied or scanned into black-and-white, then the well-insulated portions will show up as darker gray bordering on black, while the portions where there is high energy loss would be light gray bordering on white.)

Figure 4:
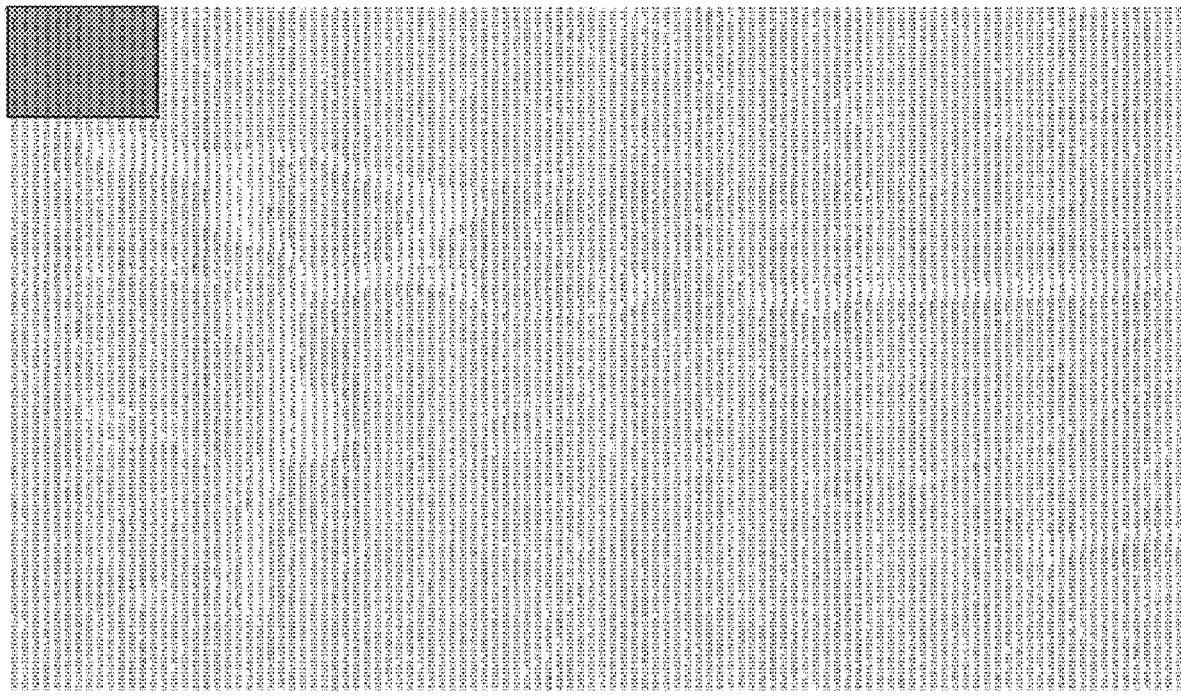
FIG. 4 shows an example building numerical energy loss map.

FIG. 4 is an example building numerical energy loss map. As can be seen, since each number shown in FIG. 4 represents a single pixel, there are a great many numbers in the table of FIG. 4. FIG. 5 is an example subset of FIG. 4, representing the shaded portion of FIG. 4.

In this example, the entries in FIGS. 4 and 5 each represent the temperature of the building. For example, the entry in the bottom right pixel in FIG. 5 is minus 3.97 which means that the building envelope has a temperature of minus 3.07 degrees Celsius at the point represented by the number. The numbers are obtained by processing the infrared building image, wherein the colour at any particular point on the image indicates the temperature of the building envelope at that point. It will be appreciated that, in this example, the ambient air would have a temperature of less than minus 3.97 degrees Celsius, since there is some heat loss through the building envelope.

It will be appreciated that energy loss through the building envelope is calculated using the interior temperature of the building, the building image set (which provides an image reflecting the temperature of the building envelope at various points), and the temperature of the outdoor air. Regarding the interior temperature, the entity for whom the report is being prepared will typically provide that information, though in some cases, the interior temperature can be assumed with reasonable precision—for example, a residential building is likely to have an interior temperature of room temperature, which is approximately 20 degrees Celsius.

Thus, in this example, the outdoor temperature may be minus 12 degrees C., and the indoor temperature 20 degrees C. As can be seen, the numbers in FIG. 5 vary from about zero degrees to about minus 6 degrees. Thus, there is substantial heat loss from this portion of the building, since the interior energy is leaking out in sufficient amounts to keep the building envelope substantially warmer than the outside air.

It will further be appreciated that other data may be useful in calculating heat loss. This data includes, for example, wind. When the outdoor air is cooler than the building envelope (and therefore, when this invention is relevant), higher winds will have a tendency to accelerate cooling, and therefore heat loss, since wind carries heat away. The relative humidity of the outside air is another factor, and the energy loss calculator may use these factors in calculating the rate of energy loss.

Referring now to FIG. 6, FIG. 6 is an example portion of a comparison image numerical map set, wherein data regarding the building and regarding a predetermined standard is used to generate the numerical map. In the example of FIG. 6, we will again assume an outdoor temperature of minus 12.

The temperature numbers shown in FIG. 6 are colder (i.e. lower) than the temperatures shown is FIG. 5. In FIG. 6, they are about minus 10 degrees C. Thus, they indicate that the building envelope is almost as cold as the outdoor air, meaning that according to the relevant predetermined standard (i.e. a building code), less heat would be lost than the actual building is losing. Thus, the portion of the building shown in FIGS. 5 and 6 does not meet the predetermined standard.

Figure 7:
FIG. 7 shows an example simulated building image.
Figure 8:
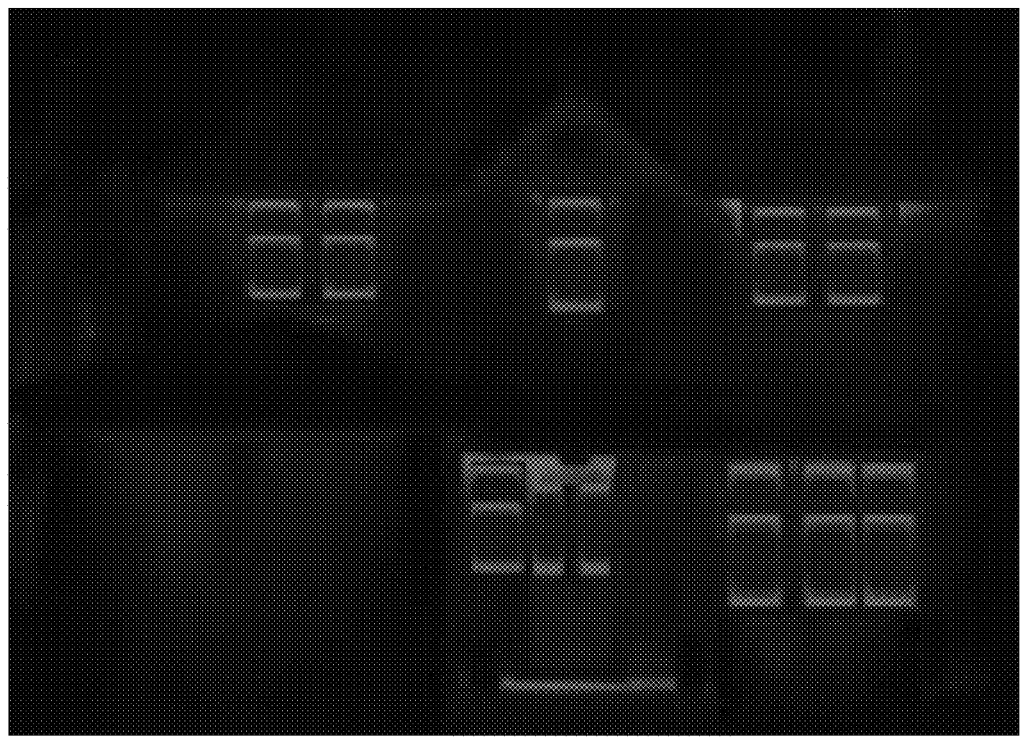
FIG. 8 shows a second example simulated building image.

FIGS. 7 and 8 each show a simulated comparison image for the same building shown in FIG. 3. A simulated comparison image is a simulated infrared image that is generated using the comparison image numerical map. Unlike the comparison image numerical map, the simulated comparison image provides a visual representation of what the building IR image would have looked like if the building had met the predetermined standard.

FIG. 7 is an example simulated comparison image showing the building as the IR image would look if it met a building code standard. FIG. 8 is an example simulated comparison image showing the building as the IR image would look if it met a lost practical energy loss standard. Thus, FIG. 7 generally shows brighter colours than FIG. 8, as FIG. 7 reflects a predetermined standard that permits greater energy loss than the predetermined standard reflected by FIG. 8.

Figure 9:
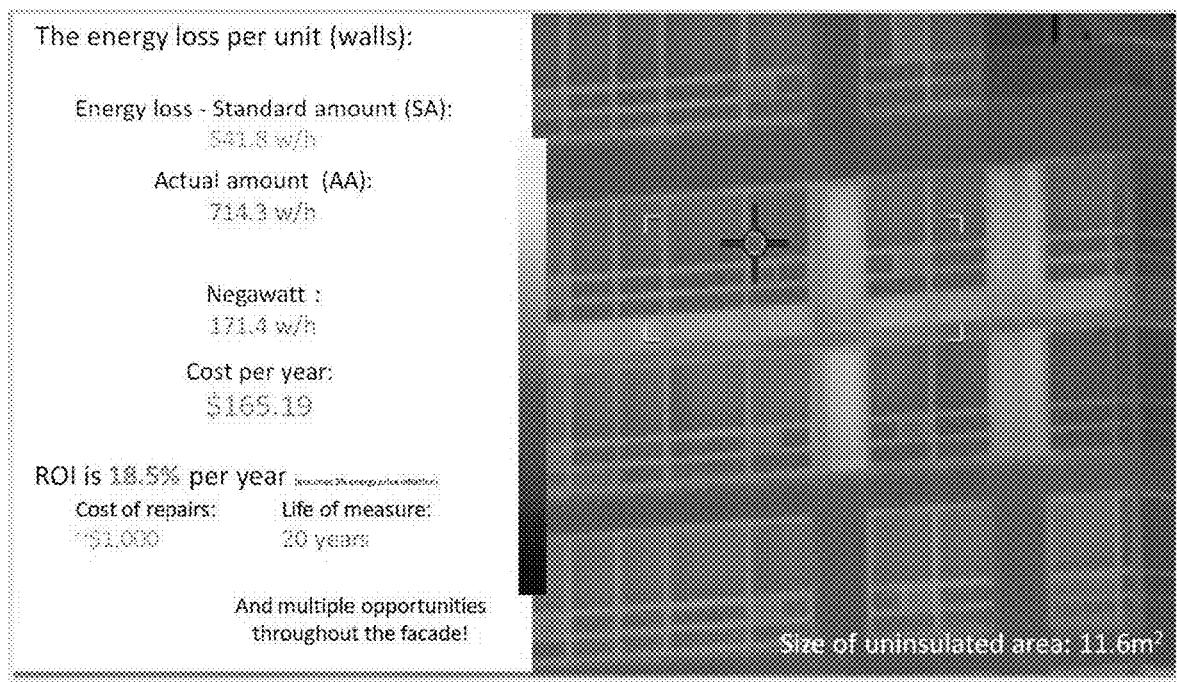
FIG. 9 shows an example report.

FIG. 9 shows an example preferred form of report that may be generated by the report generator of the present system. The report 28 shows a report building image 30, which display an IR image of a portion of a building wall. Some portions of the wall are quite bright, indicating that those areas of the walls are uninsulated. The computerized image processing resources associated with the system analyze the image to determine the high heat loss in those bright areas, and to measure the size of the uninsulated area. Thus, the report notes the size of the uninsulated area as 11.6 square metres. The report further provides the actual amount of energy loss over the uninsulated area, the standard amount (i.e. that complies with relevant legislation, such as a building code), and the difference between the two (referred to as "Negawatt™" on the report). Then this example report provides the cost per year of the energy loss in excess of the standard, which in this example is $165.19. The example report further provides an estimate of the cost of the repair (i.e. inserting insulation to meet the predetermined standard), an estimate of the ROI, and an estimate of the life of the repair measure taken.

Figure 10:
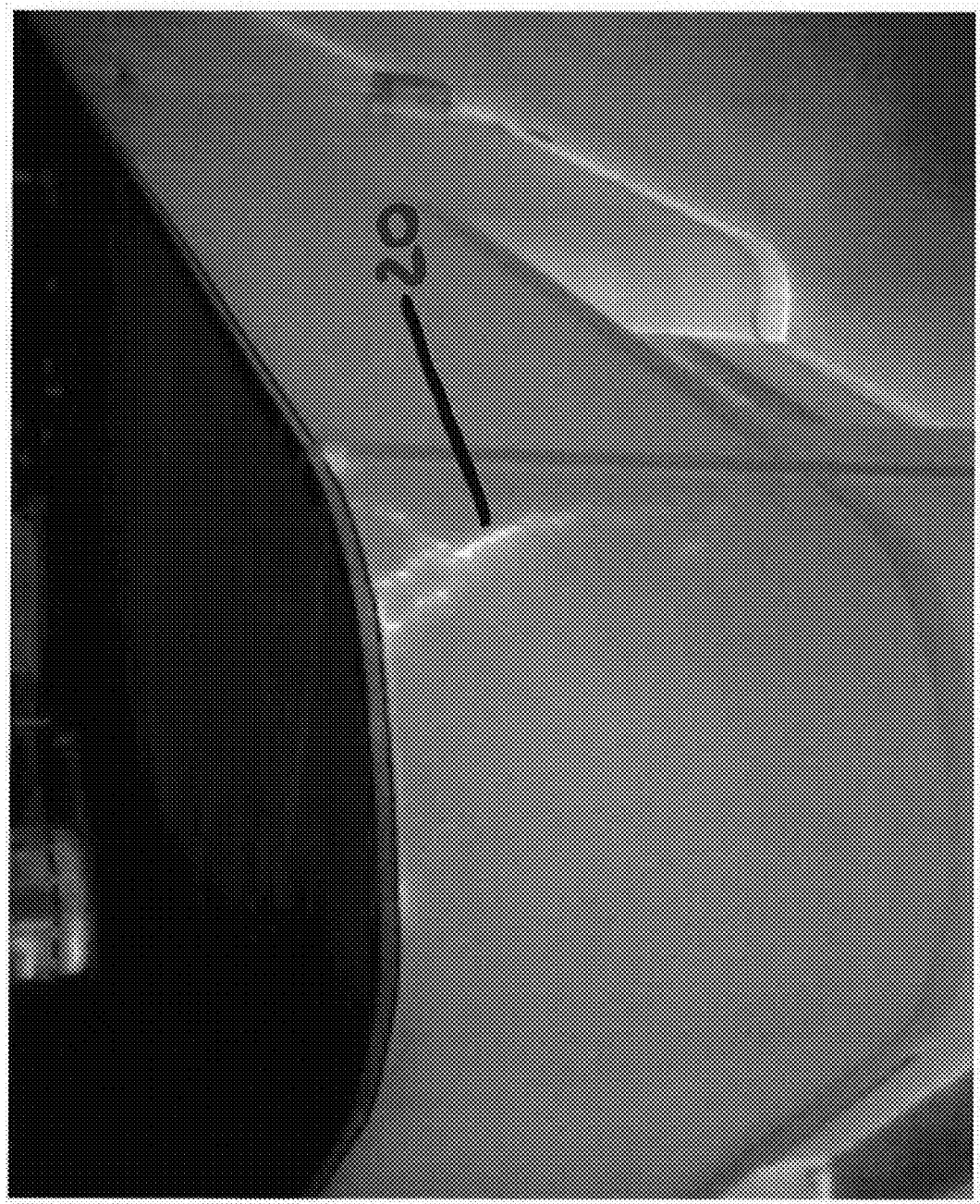
FIG. 10 shows an example image showing a crack in a building envelope.
Figure 11:
FIG. 11 shows an example image showing a water leak in a crack in a building envelope.

It will be appreciated that the preferred form of the present system can be used to detect and report other defects in building envelopes beyond heat loss. Such defects include cracks in the building, and water leaks. Thus, the computerized image processing associated with the present system can process the building image set to determine the location of a crack, or a water leak. FIGS. 10 and 11 show IR images, where a crack 20 and associated water leak 22 are visible. The crack shows up in the IR image because the discontinuity in the building envelope results in a discontinuity in the thermal pattern of the building envelope. The image processor of the current system can thus be programmed to recognize cracks. Also, the thermal conductivity coefficient of water differs substantially from that of the solid materials that make up a typical building envelope. Thus, water leaks show up on IR images and can be detected using the preferred form of the present system.

While the foregoing preferred embodiments of the present invention have been set forth in considerable detail for the purpose of making a complete disclosure of the invention, it will be apparent to those skilled in the art that other embodiments described herein are comprehended by the broad scope of the invention as defined in the appended claims.

The invention claimed is:

1. A system for quantifying building envelope energy loss for a building, the system comprising:
    a camera assembly, comprising a camera, for acquiring a building image set of said building envelope reflecting actual energy loss from the building envelope;
    a comparison image generator for generating a comparison image set using the building image set, data relating to said building, and a predetermined energy loss standard, the comparison image set reflecting a standard energy loss profile of the building envelope that meets the predetermined energy loss standard;
    an energy loss calculator for calculating at least one extent to which an actual energy loss exceeds the energy loss profile by comparing the building image set to the comparison image set and using exterior data as an energy loss calculation factor, the exterior data comprising a speed of wind associated with the building envelope;
    wherein the building image set comprises a plurality of pixels and the comparison image set comprises comparison image set elements, wherein each pixel of each building image set corresponds to a comparison image set element; and
    wherein the energy loss calculator compares the comparison image set to the building image set by comparing each comparison image set element to its corresponding building image set pixel.

2. A system as claimed in claim 1, the system further comprising a report generator for receiving and reporting said at least one extent to which the actual energy loss exceeds to the energy loss profile.

3. A system as claimed in claim 1, wherein the comparison image set comprises a comparison numerical map set comprising at least one comparison numerical map.

4. A system as claimed in claim 1, the system further comprising an image converter for converting the building image set to a building numerical map set.

5. A system as claimed in claim 3, wherein the at least one comparison numerical map is comprised of comparison numerical entries in a comparison table, and wherein said numerical entries comprise comparison building envelope temperatures, at building envelope locations, that reflect the standard energy loss profile.

6. A system as claimed in claim 4, wherein the building numerical map set comprises at least one building numerical map having building numerical entries in a building table, said building numerical entries comprising actual temperatures at building envelope locations.

7. A system as claimed in claim 1, wherein the data includes window measurements and door measurements of said building, and wherein the window measurement and door measurements are calculated using the building image set.

8. A system as claimed in claim 1, wherein the data includes the size of the building.

9. A system as claimed in claim 1, further comprising a building envelope crack detector for processing the building image set to detect cracks in the building envelope.

10. A system as claimed in claim 2, wherein the report generator further reports at least one report image providing a visual representation of energy loss.

11. A method of quantifying building envelope energy loss for a building, the method comprising:
   using an infrared camera, acquiring a building image set of said building envelope reflecting energy loss from the building envelope;
   using a processor-based comparison image generator, generating a comparison image set using the building image set, data relating to said building, and a predetermined energy loss standard, the comparison image set reflecting a standard energy loss profile of the building envelope that meets the predetermined energy loss standard;
   using a processor-based energy loss calculator, calculating at least one extent to which an actual energy loss exceeds the energy loss profile by comparing the building image set to the comparison image set and using exterior data as an energy loss calculation factor, the exterior data comprising a speed of wind associated with the building envelope;
   wherein the building image set comprises a plurality of pixels and the comparison image set comprises comparison image set elements, wherein each pixel of each building image set corresponds to a comparison image set element; and
   wherein comparing the building image set to the comparison image set comprises comparing each comparison image set element to its corresponding building image set pixel.

12. A method as claimed in claim 11, the method further comprising using a processor-based report generator to receive and report said at least one extent to which the actual energy loss exceeds to the energy loss profile.

13. A method as claimed in claim 11, wherein the comparison image set comprises a comparison numerical map set comprising at least one comparison numerical map.

14. A method as claimed in claim 11, the method further comprising using a processor-based image converter to convert the building image set to a building numerical map set.

15. A method as claimed in claim 13, wherein the at least one comparison numerical map is comprised of comparison numerical entries in a comparison table, and wherein said numerical entries comprise comparison building envelope temperatures, at building envelope locations, that reflect the standard energy loss profile.

16. A method as claimed in claim 14, wherein the building numerical map set comprises at least one building numerical map having building numerical entries in a building table, said building numerical entries comprising actual temperatures at building envelope locations.

17. A method as claimed in claim 11, wherein the data includes window measurements and door measurements of said building, and wherein the window measurement and door measurements are calculated using the building image set.

18. A method as claimed in claim 11, wherein the data includes the size of the building.

19. A method as claimed in claim 11, further comprising using a processor-based building envelope crack detector to process the building image set to detect cracks in the building envelope.

20. A method as claimed in claim 12, further comprising reporting at least one report image providing a visual representation of energy loss.

21. The system as claimed in claim 1, wherein the exterior data further comprises a humidity level of outside air at the building envelope.

22. The method as claimed in claim 11, wherein the exterior data further comprises a humidity level of outside air at the building envelope.

* * * * *